US012757299B2

(12) United States Patent
Hansen

(10) Patent No.: US 12,757,299 B2
(45) Date of Patent: Oct. 6, 2026

(54) INDUCED EDDY CURRENT HEATING APPARATUSES AND ASSOCIATED METHODS

(71) Applicant: The Boeing Company, Arlington, VA (US)

(72) Inventor: Jeffrey M. Hansen, Moses Lake, WA (US)

(73) Assignee: The Boeing Company, Arlington, VA (US)

( * ) Notice: Subject to any disclaimer, the term of this patent is extended or adjusted under 35 U.S.C. 154(b) by 841 days.

(21) Appl. No.: 18/176,579

(22) Filed: Mar. 1, 2023

(65) Prior Publication Data

US 2024/0298385 A1 Sep. 5, 2024

(51) Int. Cl.
*H05B 6/10* (2006.01)
*H05B 6/36* (2006.01)

(52) U.S. Cl.
CPC ............... *H05B 6/105* (2013.01); *H05B 6/36* (2013.01)

(58) Field of Classification Search
CPC ... H05B 6/36; H05B 6/44; H05B 6/06; H05B 6/107; H05B 6/105
See application file for complete search history.

(56) References Cited

U.S. PATENT DOCUMENTS

| | | | | |
|---|---|---|---|---|
| 10,113,253 | B2 | 10/2018 | Hottes et al. | |
| 2012/0145703 | A1* | 6/2012 | Matsen .................. | B29C 73/10 219/618 |
| 2016/0143092 | A1 | 5/2016 | Miller et al. | |
| 2017/0092421 | A1 | 3/2017 | Hottes et al. | |
| 2017/0094729 | A1 | 3/2017 | Hottes et al. | |

FOREIGN PATENT DOCUMENTS

| | | | |
|---|---|---|---|
| CA | 3047685 A1 * | 3/2020 | ............ H05B 6/105 |

* cited by examiner

*Primary Examiner* — Nathaniel E Wiehe
*Assistant Examiner* — Daniel S Collins
(74) *Attorney, Agent, or Firm* — Walters & Wasylyna LLC

(57) ABSTRACT

An induced eddy current heating apparatus includes a flexible substrate, a conductor wire and a susceptor wire. The conductor wire is overlaid on a major surface of the flexible substrate. The susceptor wire extends back and forth through the flexible substrate and back and forth across the conductor wire to sew the conductor wire to the major surface of the flexible substrate. A method for generating induced eddy current heating using the induced eddy current heating apparatus is provided. A method of manufacturing the induced eddy current heating apparatus is also provided.

20 Claims, 9 Drawing Sheets

INDUCED EDDY CURRENT HEATING APPARATUSES AND ASSOCIATED METHODS

FIELD

The present disclosure relates generally to generating induced eddy current heating and, particularly, to various induced eddy current heating apparatuses, such as induced eddy current heating apparatuses for use in heating blankets used to cure composite material in conjunction with composite manufacturing and repair. Various examples of methods for using the induced eddy current heating apparatuses are also disclosed. For example, the induced eddy current heating apparatuses can be tuned to lower temperatures for consumer products as well as the high temperature associated with the heater blankets for curing composites. Applications in other temperature ranges and other types of products are also contemplated.

BACKGROUND

Induced eddy current heating in current heater blankets for curing composite materials may use a susceptor wire that is coaxially wrapped around a conductor wire. For example, the coaxial arrangement is laminated and arranged to form into a matrix-like array assembly. The matrix-like array provides induced eddy current heating and can be inserted into a heater blanket housing to form the heater blanket. Producing the coaxial arrangement and the matrix-like array in current induced eddy current heating assemblies is complex and time consuming.

Accordingly, those skilled in the art continue with research and development efforts to improve the design of induced eddy current heating assemblies to streamline manufacturing and processes and to implement more automated processes.

SUMMARY

Disclosed are examples of apparatuses and methods for generating induced eddy current heating. Examples of methods of manufacturing induced eddy current heating apparatuses are also disclosed. The following is a non-exhaustive list of examples, which may or may not be claimed, of the subject matter according to the present disclosure.

In an example, the disclosed induced eddy current heating apparatus includes a flexible substrate, a conductor wire and a susceptor wire. The flexible substrate may have a first major surface and a second major surface. The conductor wire overlaid in a predetermined path on the first major surface of the flexible substrate. The susceptor wire extending back and forth through the flexible substrate and back and forth across the conductor wire to sew the conductor wire to the first major surface of the flexible substrate.

In an example, the disclosed method for generating induced eddy current heating includes: (1) receiving an alternating current (AC) electrical signal having a predetermined frequency range, a predetermined voltage range and a predetermined current range from a current source at a conductor wire overlaid in a predetermined path on a flexible substrate of an induced eddy current heating apparatus; (2) generating a magnetic field in a region around the conductor wire in response to the AC electrical signal; (3) inductively receiving energy from the magnetic field at a susceptor wire of the induced eddy current heating apparatus, wherein the susceptor wire extends back and forth through the flexible substrate and back and forth across the conductor wire to sew the conductor wire to the flexible substrate; (4) generating eddy currents in the susceptor wire in response to the inductively received energy; and (5) radiating heat from the susceptor wire in response to the eddy currents.

In an example, the disclosed method for manufacturing an induced eddy current heating apparatus includes: (1) obtaining a flexible substrate having a first major surface and a second major surface; (2) overlaying a conductor wire in a predetermined path on the first major surface of the flexible substrate; and (3) sewing the conductor wire to the first major surface of the flexible substrate using a susceptor wire.

Other examples of the disclosed induced eddy current heating apparatuses and associated methods will become apparent from the following detailed description, the accompanying drawings and the appended claims.

DETAILED DESCRIPTION

Figure 1:
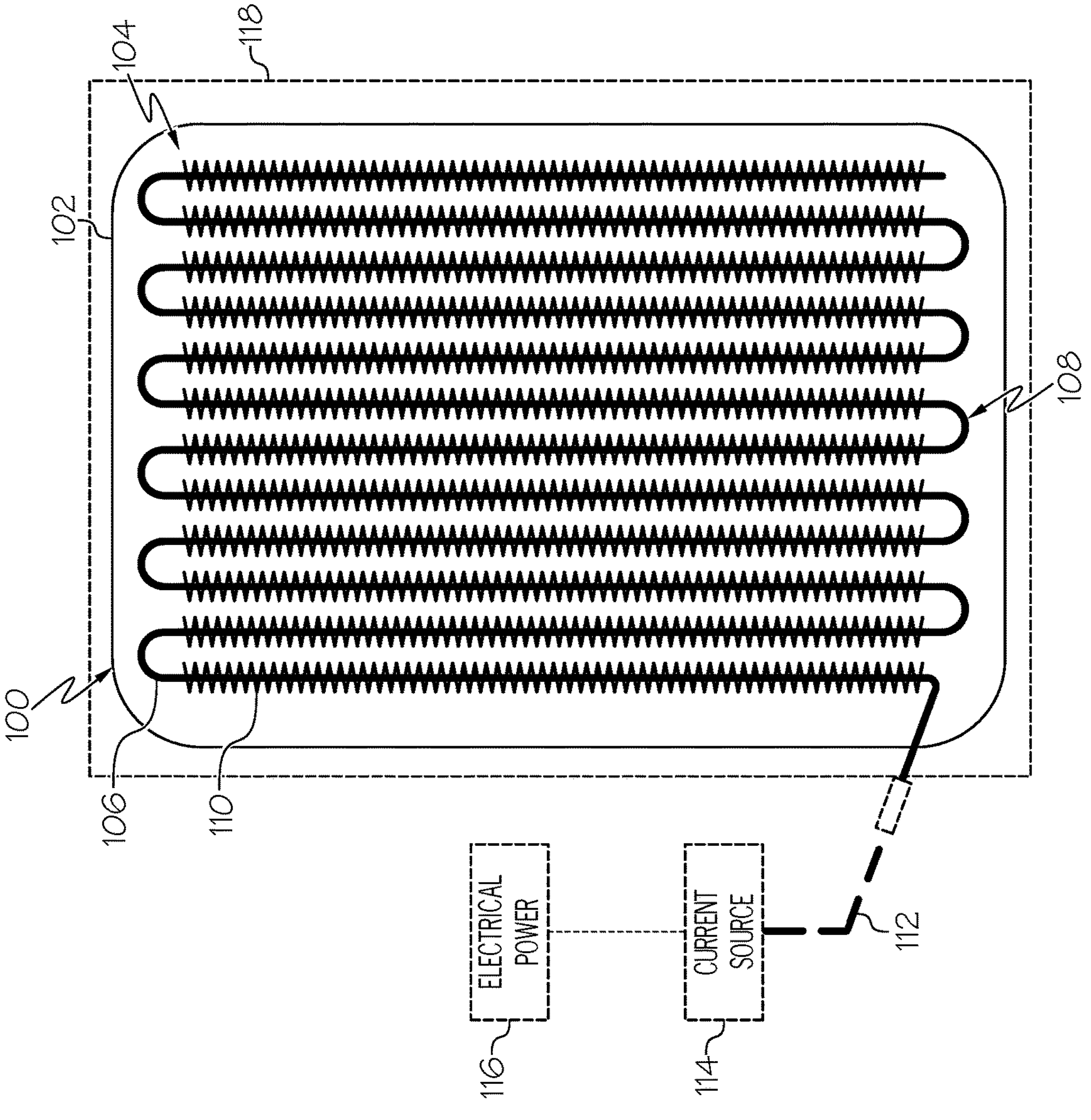
FIG. 1 is a functional block diagram of an example of an induced eddy current heating apparatus for generating induced eddy current heating.
Figure 2A:
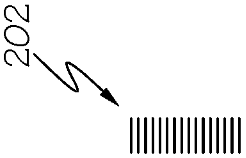
FIGS. 2A-E provide top views of several examples of stitches used for the susceptor wire of FIG. 1 in sewing the conductor wire to the flexible substrate.
Figure 2B:
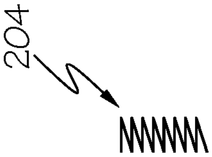
Figure 2C:
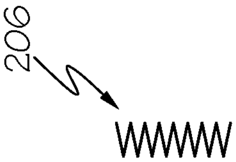
Figure 2D:
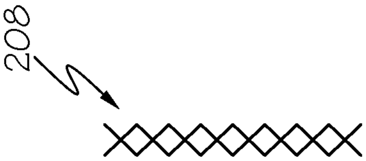
Figure 2E:
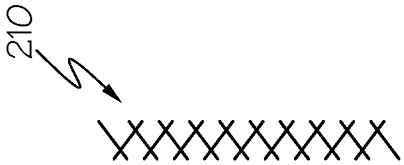
Figure 3:
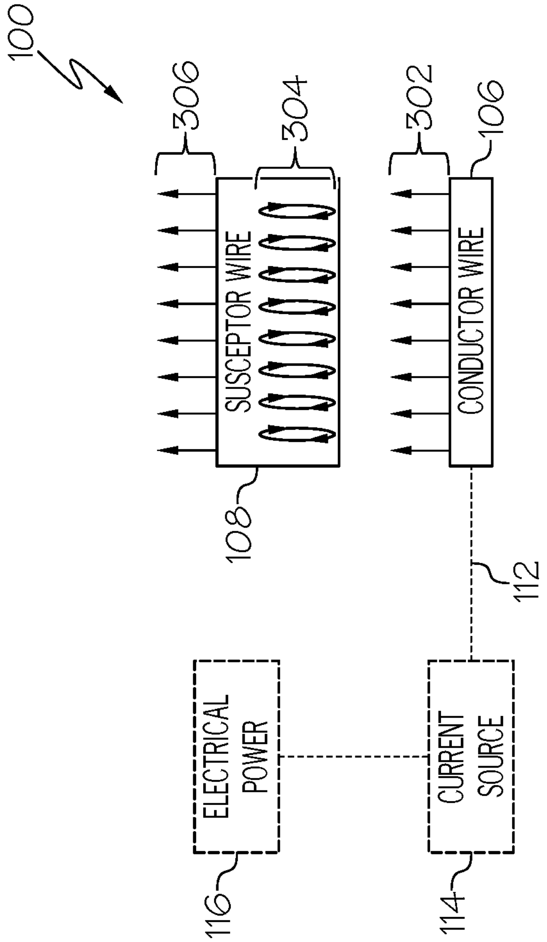
FIG. 3 is a function block diagram of another example of an induced eddy current heating apparatus for generating induced eddy current heating.

Referring generally to FIGS. 1, 2A-E and 3, by way of examples, the present disclosure is directed to an induced eddy current heating apparatus 100 for generating induced eddy current heating. FIG. 1 discloses an example of the induced eddy current heating apparatus 100 that includes a flexible substrate 102, a conductor wire 106 and a susceptor wire 110. FIGS. 2A-E discloses several examples of stitches used for the susceptor wire in sewing the conductor wire to the flexible substrate. FIG. 3 discloses the flow of energy from a magnetic field 302 generated by the conductor wire 106 to heat 306 radiated by the susceptor wire 110. As shown in FIG. 3, direct electrical contact between the conductor wire 106 and the susceptor wire 110 is not required. However, if there happens to be direct electrical contact between the conductor wire 106 and the susceptor wire 110, the induced eddy current heating operation continues to operate as described herein. Thus, there is no requirement to prevent direct electrical contact between the conductor wire 106 and the susceptor wire 110.

With reference again to FIG. 1, in one or more examples, an induced eddy current heating apparatus 100 for generating induced eddy current heating includes a flexible substrate 102, a conductor wire 106 and a susceptor wire 110. The flexible substrate 102 may have a first major surface 104 and a second major surface. The conductor wire 106 overlaid in a predetermined path 108 on the first major surface 104 of the flexible substrate 102. The susceptor wire 110 extending back and forth through the flexible substrate 102 and back and forth across the conductor wire 106 to sew the conductor wire 106 to the first major surface 104 of the flexible substrate 102.

In another example, the induced eddy current heating apparatus 100 is configured to generate induced eddy current heating below a predetermined maximum temperature. In further examples of the induced eddy current heating apparatus 100, the predetermined maximum temperature is: i) a temperature within a range spanning from about 250° F. to about 400° F., ii) a temperature within a range spanning from about 250° F. to about 275° F.; iii) a temperature within a range spanning from about 65° F. to about 180° F., or vi) a temperature within another desired range.

In yet another example of the induced eddy current heating apparatus 100, the flexible substrate 102 includes at least one of a fiberglass material, a silicone material, a polyester material, a plastic material, a Mylar® material (a stretched polyester film), a Nomex® material (a flame-resistant meta-aramid material), and any other suitable flexible material in any suitable combination. In still another example of the induced eddy current heating apparatus 100, the flexible substrate 102 includes at least one of a mesh, a fabric, a sheet, a film, or any other suitable flexible substrate in any suitable combination. In still yet another example of the induced eddy current heating apparatus 100, the flexible substrate 102 has a thickness that ranges between about 0.010 inches and about 0.020 inches. In another example of the induced eddy current heating apparatus 100, the flexible substrate 102 has thickness that ranges between about 0.002 inches and about 0.040 inches. In other examples, the thickness of the flexible substrate may be less than 0.002 inches or greater than 0.040 inches.

In yet another example of the induced eddy current heating apparatus 100, the predetermined path 108 is configured such that, over a longitudinal axis of the conductor wire 106, an outer surface area of the conductor wire 106 does not contact another outer surface area of the conductor wire 106.

In still yet another example of the induced eddy current heating apparatus 100, the conductor wire 106 includes at least one of a plurality of braided copper wires, a plurality of a stranded copper wire, a solid copper wire, non-copper wire and any other suitable conductor wire in any suitable combination. In a further example, individual wires of the conductor wire 106 or at least a portion thereof are coated with a film.

In another example of the induced eddy current heating apparatus 100, the conductor wire (106) includes a Litz wire. In a further example, the Litz wire includes an outer insulation.

In yet another example of the induced eddy current heating apparatus 100, the conductor wire 106 is configured to receive an alternating current (AC) electrical signal 112 at a predetermined frequency range, at a predetermined voltage range and at a predetermined current range from a current source 114. In a further example, the conductor wire 106 is configured to operate as an antenna that radiates radio waves in response to the AC electrical signal 112. In another further example, the conductor wire 106 is configured to generate a magnetic field 302 (see FIG. 3) in response to the AC electrical signal 112.

In yet another further example, the predetermined frequency range is between about 1 kHz and about 400 kHz or any other suitable frequency range. In still another further example, the predetermined frequency range is at least one of between about 1 kHz and about 10 kHz, between about 10 kHz and about 20 kHz, between about 20 kHz and about 50 kHz, between about 50 kHz and about 100 kHz, between about 100 kHz and about 200 kHz, between about 200 kHz and about 350 kHz and any other suitable frequency range. In still yet another further example, the predetermined voltage range is between about 50 volts and about 70 volts or any other suitable voltage range. In another further example, the predetermined voltage range is between about 10 volts and about 300 volts or any other suitable voltage range. In yet another further example, the predetermined current range is between about 10 amps and about 1000 amps or any other suitable current range.

In still another example of the induced eddy current heating apparatus 100, the conductor wire 106 is a select wire size that ranges between 14 American wire gauge (AWG) wire through 26 AWG wire or any other suitable wire size.

With reference again to FIGS. 1 and 2, in various examples of the induced eddy current heating apparatus 100, the conductor wire 106 is sewn to the first major surface 104 by the susceptor wire 110 using at least one of a satin stitch 202, a "Z" zigzag stitch 204, a zigzag stitch 206, a cross stitch 208, a herringbone stitch 210, a double stitch and any other suitable stitch in any suitable combination.

With reference again to FIG. 1, in still yet another example of the induced eddy current heating apparatus 100, portions of the susceptor wire 110 that cross the conductor wire 106 cross approximately perpendicular to a longitudinal axis of the conductor wire 106.

In another example of the induced eddy current heating apparatus 100, the susceptor wire 110 includes a nickel-iron ferromagnetic alloy. In yet another example of the induced eddy current heating apparatus 100, the susceptor wire 110 includes a mu-metal. In still another example of the induced eddy current heating apparatus 100, the susceptor wire 110 includes at least one of carbon (C), chromium (Cr), copper (Cu), iron (Fe), manganese (Mn), molybdenum (Mo), nickel (Ni), phosphorous (P), silicon (Si) and sulfur (S). In still yet another example of the induced eddy current heating apparatus 100, the susceptor wire 110 includes an alloy including about 68 percent iron (Fe) and about 32 percent nickel (N). In another example of the induced eddy current heating apparatus 100, the susceptor wire 110 includes an alloy including about 66 percent iron (Fe) and about 34 percent nickel (N).

With reference again to FIGS. 1 and 3, in another example of the induced eddy current heating apparatus 100, the susceptor wire 110 is configured to inductively receive energy from a magnetic field 302 generated by the conductor wire 106. Then, the susceptor wire 110 is configured to generate eddy currents 304 in response to the inductively received energy. Next, the susceptor wire 110 is configured to radiate heat 306 in response to the eddy currents 304. In yet another example of the induced eddy current heating apparatus 100, the susceptor wire 110 is configured to lose permanent magnetic properties at a predetermined maximum temperature. For example, a susceptor wire 110 that loses permanent magnetic properties at a predetermined maximum temperature may be referred to as a "smart"

susceptor. In a further example, the predetermined maximum temperature is based at least in part on an alloy composition of the susceptor wire 110. In another further example, the predetermined maximum temperature is a Curie temperature for the susceptor wire 110. In yet another further example, the predetermined maximum temperature is at least one of about 400° F., about 350° F., about 275° F., about 250° F., about 180° F., about 140° F., about 130° F., about 120° F., about 117° F., about 110° F., about 105° F., about 103° F., about 100° F., about 95° F., about 89° F., about 82° F., about 75° F., about 68° F. and any other suitable maximum temperature in any suitable combination.

With reference again to FIG. 1, in still another example of the induced eddy current heating apparatus 100, the susceptor wire 110 has a diameter that ranges between about 0.005 inches and about 0.015 inches. In still yet another example of the induced eddy current heating apparatus 100, the susceptor wire 110 has a diameter that ranges between about 0.005 inches and about 0.040 inches. In other examples, the diameter of the susceptor wire may be less than 0.005 inches or greater than 0.040 inches. In another example of the induced eddy current heating apparatus 100, the susceptor wire 110 is a select wire size that ranges between 18 AWG wire through 36 AWG wire or any other suitable wire size. In yet another example of the induced eddy current heating apparatus 100, the susceptor wire 110 includes a plurality of wire segments. In still another example of the induced eddy current heating apparatus 100, the susceptor wire 110 includes an insulation coating.

Referring generally to FIGS. 1, 2A-E and 4, by way of examples, the present disclosure is directed to a method 400 for generating induced eddy current heating. At 402, an AC electrical signal 112 having a predetermined frequency range, a predetermined voltage range and a predetermined current range is received from a current source 114 at a conductor wire 106 overlaid in a predetermined path 108 on a flexible substrate 102 of an induced eddy current heating apparatus 100. At 404, a magnetic field 302 is generated in a region around the conductor wire 106 in response to the AC electrical signal 112. At 406, energy from the magnetic field 302 is inductively received at a susceptor wire 110 of the induced eddy current heating apparatus 100. The susceptor wire 110 extends back and forth through the flexible substrate 102 and back and forth across the conductor wire 106 to sew the conductor wire 106 to the flexible substrate 102. At 408, eddy currents 304 are generated in the susceptor wire 110 in response to the inductively received energy. At 410, heat 306 is radiated from the susceptor wire 110 in response to the eddy currents 304.

In another example of the method 400, the induced eddy current heating apparatus 100 is configured to generate induced eddy current heating below a predetermined maximum temperature. In a further example, the predetermined maximum temperature is: i) a temperature within a range spanning from about 250° F. to about 400° F., ii) a temperature within a range spanning from about 250° F. to about 275° F., iii) a temperature within a range spanning from about 65° F. to about 180° F., or iv) a temperature within another desired range.

In yet another example of the method 400, the predetermined path 108 is configured such that, over a longitudinal axis of the conductor wire 106, an outer surface area of the conductor wire 106 does not contact another outer surface area of the conductor wire 106.

In still another example of the method 400, the conductor wire 106 is configured to operate as an antenna that radiates radio waves in response to the AC electrical signal 112. In still yet another example of the method 400, the predetermined frequency range is between about 1 kHz and about 400 kHz or any other suitable frequency range. In another example of the method 400, the predetermined voltage range is between about 10 volts and about 300 volts or any other suitable voltage range. In yet another example of the method 400, the predetermined current range is between about 10 amps and about 1000 amps or any other suitable current range.

In still another example of the method 400, the conductor wire 106 is sewn to the flexible substrate 102 by the susceptor wire 110 using at least one of a satin stitch 202, a "Z" zigzag stitch 204, a zigzag stitch 206, a cross stitch 208, a herringbone stitch 210, a double stitch and any other suitable stitch in any suitable combination. In still yet another example of the method 400, portions of the susceptor wire 110 that cross the conductor wire 106 cross approximately perpendicular to a longitudinal axis of the conductor wire 106. In another example of the method 400, the susceptor wire 110 is configured to lose permanent magnetic properties at a predetermined maximum temperature. For example, a susceptor wire 110 that loses permanent magnetic properties at a predetermined maximum temperature may be referred to as a "smart" susceptor. In a further example, the predetermined maximum temperature is based at least in part on an alloy composition of the susceptor wire 110. In another further example, the predetermined maximum temperature is a Curie temperature for the susceptor wire 110.

Referring generally to FIGS. 1, 2A-E and 5-7, by way of examples, the present disclosure is directed to a method 500 of manufacturing an induced eddy current heating apparatus 100. At 502, a flexible substrate 102 having a first major surface 104 and a second major surface (opposed from the first major surface 104) is obtained. At 504, a conductor wire 106 is overlaid, in a predetermined path 108, on the first major surface 104 of the flexible substrate 102. At 506, the conductor wire 106 is sewn to the first major surface 104 of the flexible substrate 102 using a susceptor wire 110.

In another example of the method 500, the flexible substrate 102 may have a predetermined dimension that is sized to permit the induced eddy current heating apparatus 100 to fit inside a thermally conductive enclosure 118 associated with at least one of a beverage warmer, food warmers, a consumer heating pad, a consumer heating blanket, a heater blanket for curing a composite material repair, a heater blanket for curing a composite material, any suitable consumer product, and any other suitable product.

In yet another example of the method 500, the predetermined path 108 is configured such that, over a longitudinal axis of the conductor wire 106, an outer surface area of the conductor wire 106 does not contact another outer surface area of the conductor wire 106.

In still another example of the method 500, the sewing 506 includes extending 602 the susceptor wire 110 back and forth through the flexible substrate 102 and back and forth across the conductor wire 106. In a further example, portions of the susceptor wire 110 that cross the conductor wire 106 cross approximately perpendicular to a longitudinal axis of the conductor wire 106.

In still yet another example of the method 500, the sewing 506 includes using 604 at least one of a satin stitch 202, a "Z" zigzag stitch 204, a zigzag stitch 206, a cross stitch 208, a herringbone stitch 210, a double stitch and any other suitable stitch in any suitable combination to sew the conductor wire 106 to the first major surface 104 of the flexible substrate 102.

Figure 7:
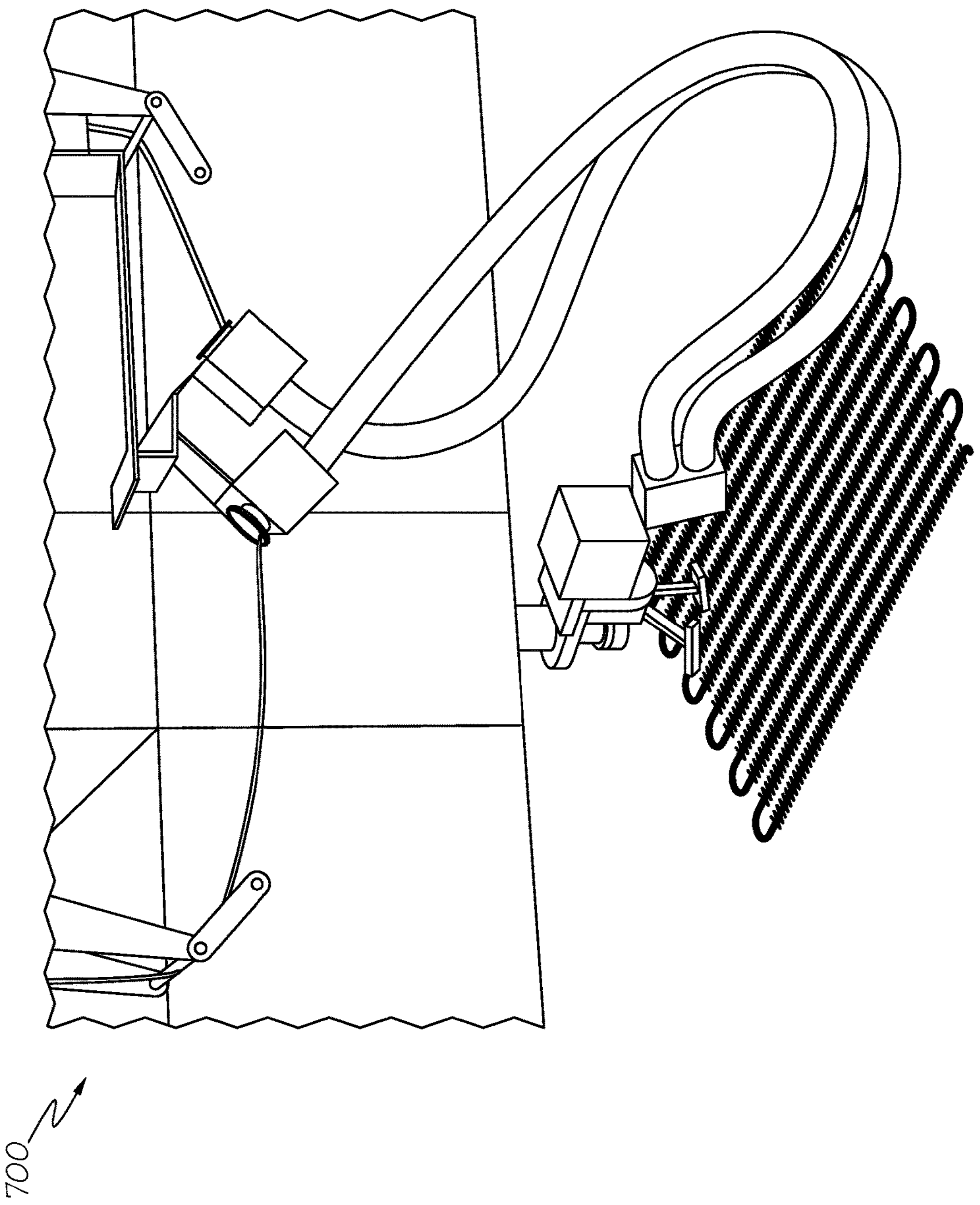
FIG. 7 provides a perspective view of a computer numeric code (CNC) embroidery machine being used in manufacturing the induced eddy current heating apparatus of FIG. 1.

In another example of the method 500, the sewing 506 is performed using a sewing machine. In a further example, the sewing machine is a CNC sewing machine. In another example of the method 500, the sewing 506 is performed using an embroidery machine. In a further example, the embroidery machine is a CNC embroidery machine 700. FIG. 7 depicts a W-head on a Model JGVA 0109 Triple Embroidery Head System by ZSK Machines of St. Louis, MO. This ZSK system is an example of a CNC embroidery machine. The W-head, for example, can be used to sew the conductor wire 106 to the flexible substrate 102 using the susceptor wire 110.

In yet another example of the method 500, the susceptor wire 110 includes a plurality of wire segments.

Examples of the induced eddy current heating apparatus 100 and associated methods 400, 500 may be related to, or used in the context of heated blankets used to cure thermoplastic composite parts used in aircraft manufacturing. Although an aircraft example is described, the examples and principles disclosed herein may be applied to other products in the aerospace industry and other industries, such as the automotive industry, the space industry, the construction industry and other design and manufacturing industries. Accordingly, in addition to aircraft, the examples and principles disclosed herein may apply to the use of induced eddy current heating in consumer products such as beverage warmers, food warmers, heating pads and heating blankets.

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component, or step preceded with the word "a" or "an" should be understood as not excluding a plurality of features, elements, components, or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, the phrase "at least one of," when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations. As used herein, the term "and/or" and the "/" symbol includes any and all combinations of one or more of the associated listed items.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represents a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

Figure 4:
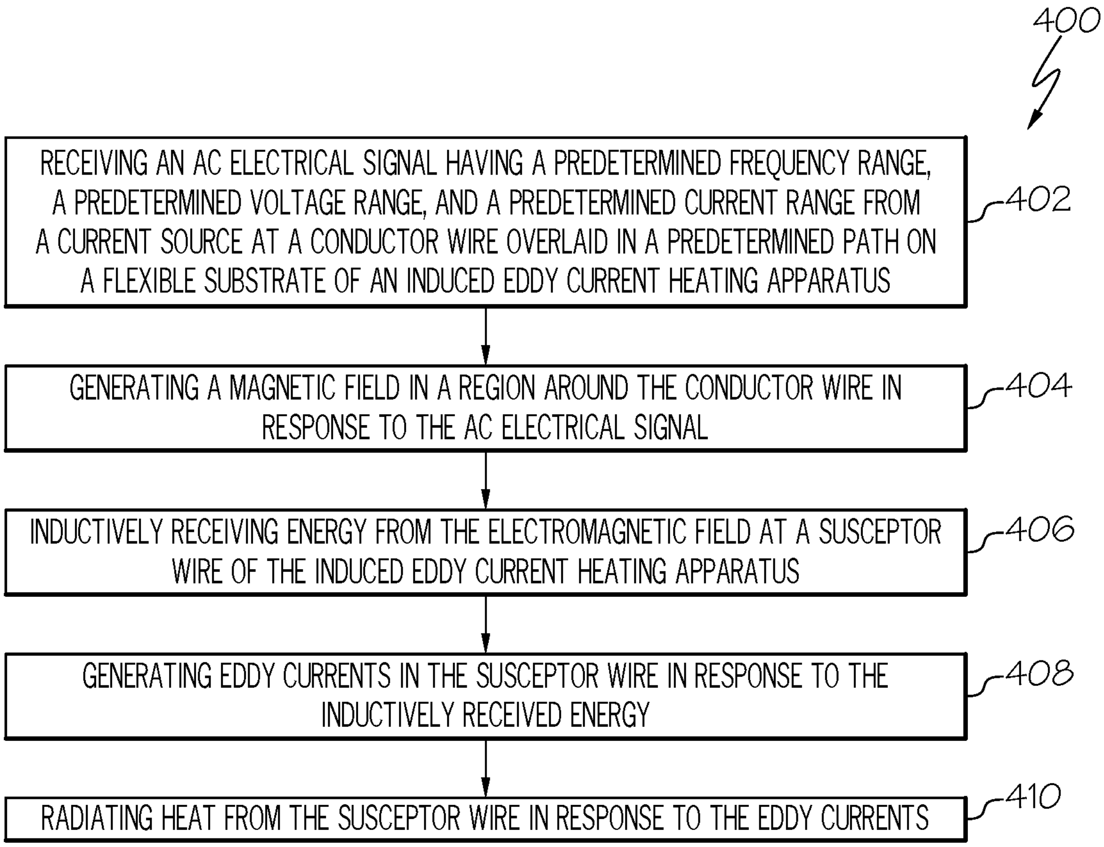
FIG. 4 is a flow diagram of an example of a method for generating induced eddy current heating.
Figure 5:
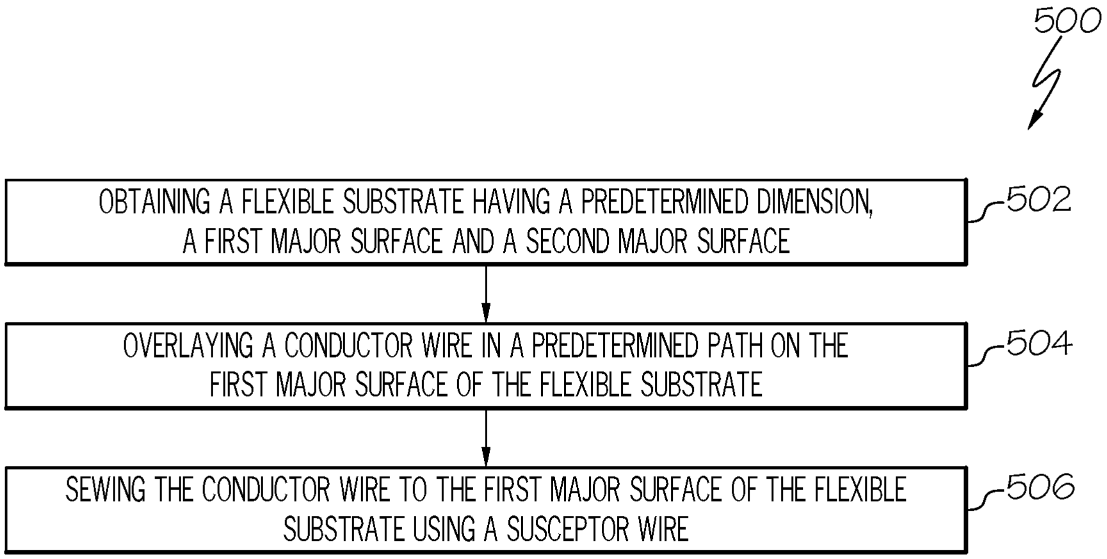
FIG. 5 is a flow diagram of an example of a method for manufacturing an induced eddy current heating apparatus.
Figure 6:
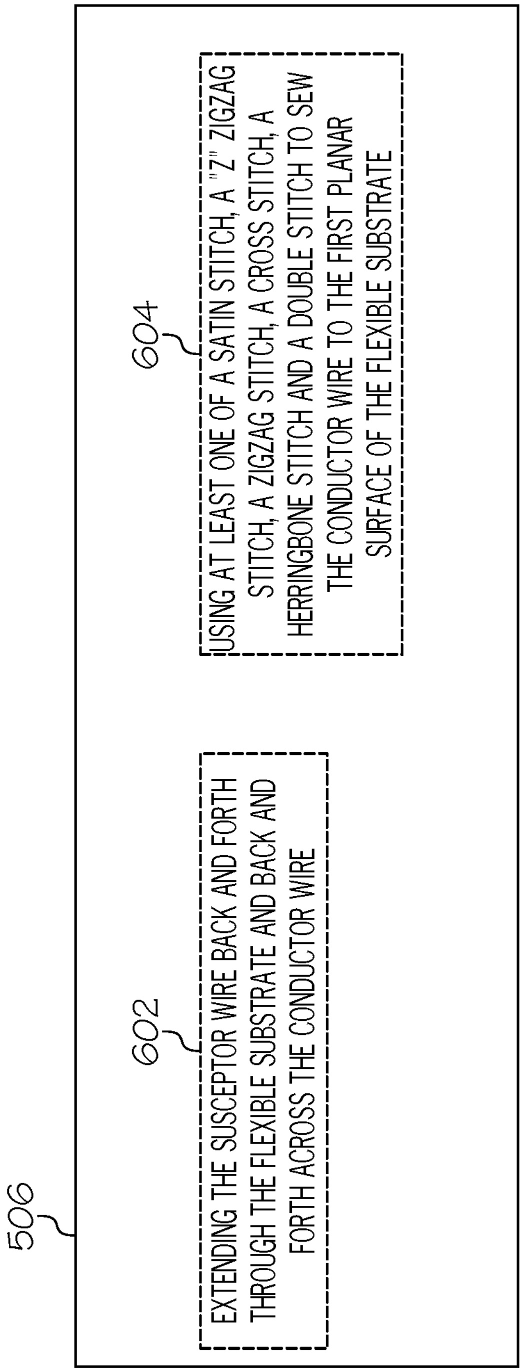
FIG. 6, in combination with FIG. 5, is a flow diagram showing several examples for the sewing of the conductor wire in FIG. 5.

In FIGS. 4-6, referred to above, the blocks may represent operations, steps, and/or portions thereof, and lines connecting the various blocks do not imply any particular order or dependency of the operations or portions thereof. It will be understood that not all dependencies among the various disclosed operations are necessarily represented. FIGS. 4-6 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

FIGS. 1, 2A-E, 3 and 7, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features, and/or components described and illustrated in FIGS. 1, 2A-E, 3 and 7, referred to above, need be included in every example and not all elements, features, and/or components described herein are necessarily depicted in each illustrative example. Accordingly, some of the elements, features, and/or components described and illustrated in FIGS. 1, 2A-E, 3 and 7 may be combined in various ways without the need to include other features described and illustrated in FIGS. 1, 2A-E, 3 and 7, other drawing figures, and/or the accompanying disclosure, even though such combination or combinations are not explicitly illustrated herein. Similarly, additional features not limited to the examples presented, may be combined with some or all the features shown and described herein. Unless otherwise explicitly stated, the schematic illustrations of the examples depicted in FIGS. 1, 2A-E, 3 and 7, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features, and/or components that serve a similar, or at least substantially similar, purpose are labeled with like numbers in each of FIGS. 1, 2A-E, 3 and 7, and such elements, features, and/or components may not be discussed in detail herein with reference to each of FIGS. 1, 2A-E, 3 and 7. Similarly, all elements, features, and/or components may not be labeled in each of FIGS. 1, 2A-E, 3 and 7, but reference numerals associated therewith may be utilized herein for consistency.

Further, references throughout the present specification to features, advantages, or similar language used herein do not imply that all the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but does not necessarily, refer to the same example.

Figure 8:
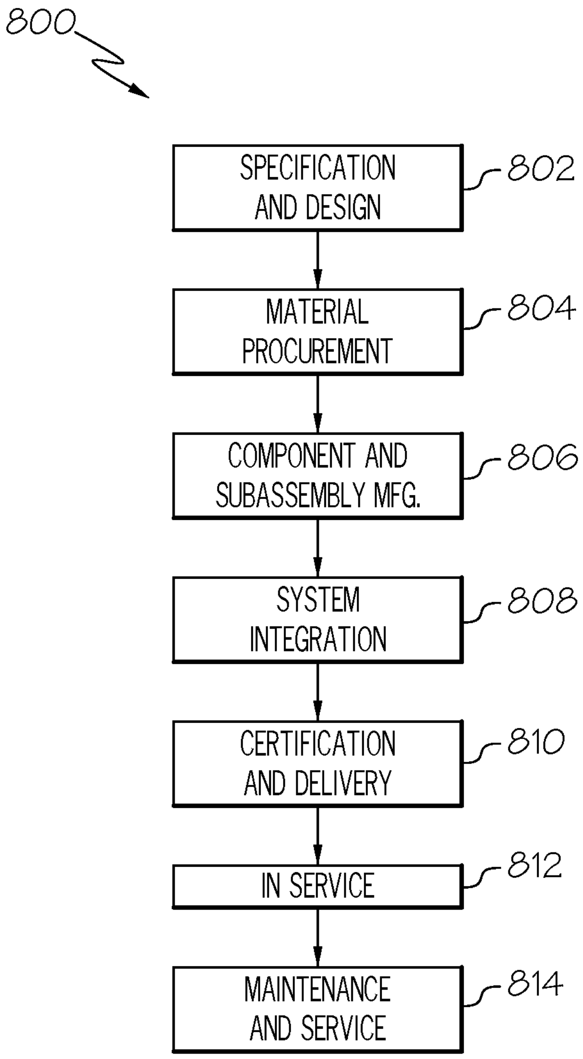
FIG. 8 is a block diagram of aircraft production and service methodology.
Figure 9:
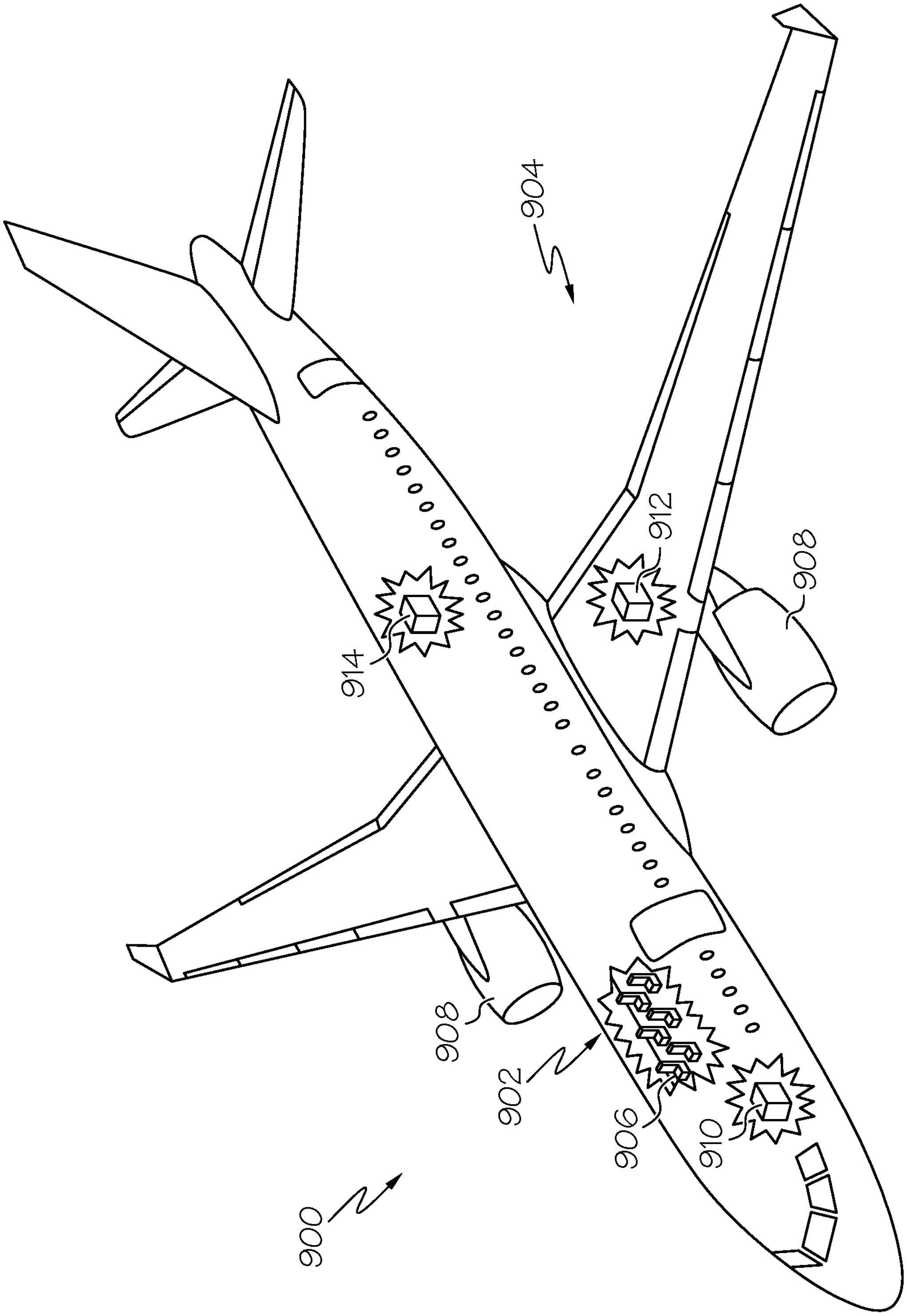
FIG. 9 is a schematic illustration of an aircraft.

Examples of the subject matter disclosed herein may be described in the context of aircraft manufacturing and service method 800 as shown in FIG. 8 and aircraft 900 as shown in FIG. 9. In one or more examples, the disclosed methods and systems for associating test data for a part under test with an end item coordinate system may be used in aircraft manufacturing. During pre-production, the service method 800 may include specification and design (block 802) of aircraft 900 and material procurement (block 804). During production, component and subassembly manufacturing (block 806) and system integration (block 808) of aircraft 900 may take place. Thereafter, aircraft 900 may go through certification and delivery (block 810) to be placed in service (block 812). While in service, aircraft 900 may be scheduled for routine maintenance and service (block 814). Routine maintenance and service may include modification, reconfiguration, refurbishment, etc. of one or more systems of aircraft 900.

Each of the processes of the service method 800 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 9, aircraft 900 produced by the service method 800 may include airframe 902 with a plurality of high-level systems 904 and interior 906. Examples of high-level systems 904 include one or more of propulsion system 908, electrical system 910, hydraulic system 912, and environmental system 914. Any number of other systems may be included. Although an aerospace example is shown, the principles disclosed herein may be applied to other industries, such as the automotive industry. Accordingly, in addition to aircraft 900, the principles disclosed herein may apply to other vehicles, e.g., land vehicles, marine vehicles, space vehicles, etc.

The disclosed systems and methods for associating test data for a part under test with an end item coordinate system may be employed during any one or more of the stages of the manufacturing and service method 800. For example, components or subassemblies corresponding to component and subassembly manufacturing (block 806) may be fabricated or manufactured in a manner similar to components or subassemblies produced while aircraft 900 is in service (block 812). Also, one or more examples of the system(s), method(s), or combination thereof may be utilized during production stages (block 806 and block 808), for example, by substantially expediting assembly of or reducing the cost of aircraft 900. Similarly, one or more examples of the system or method realizations, or a combination thereof, may be utilized, for example and without limitation, while aircraft 900 is in service (block 812) and/or during maintenance and service (block 814).

Further, the disclosure comprise examples according to the following clauses:

Clause 1. An induced eddy current heating apparatus (100) comprising: a flexible substrate (102) having a first major surface (104) and a second major surface; a conductor wire (106) overlaid in a predetermined path (108) on the first major surface (104) of the flexible substrate (102); and a susceptor wire (110) extending back and forth through the flexible substrate (102) and back and forth across the conductor wire (106) to sew the conductor wire (106) to the first major surface (104) of the flexible substrate (102).

Clause 2. The induced eddy current heating apparatus of Clause 1, wherein the apparatus (100) is configured to generate induced eddy current heating below a predetermined maximum temperature.

Clause 3. The induced eddy current heating apparatus of Clause 2, wherein the predetermined maximum temperature is: a temperature within a range spanning from about 250° F. to about 400° F.; or a temperature within a range spanning from about 250° F. to about 275° F.; or a temperature within a range spanning from about 65° F. to about 180° F.

Clause 4. The induced eddy current heating apparatus of Clause 1, wherein the flexible substrate (102) comprises at least one of a fiberglass material, a silicone material, a polyester material, a plastic material, a stretched polyester film, a flame-resistant meta-aramid material.

Clause 5. The induced eddy current heating apparatus of Clause 1, wherein the flexible substrate (102) comprises at least one of a mesh, a fabric, a sheet and a film.

Clause 6. The induced eddy current heating apparatus of Clause 1, wherein the flexible substrate (102) has a thickness that ranges between about 0.010 inches and about 0.020 inches.

Clause 7. The induced eddy current heating apparatus of Clause 1, wherein the flexible substrate (102) has thickness that ranges between about 0.002 inches and about 0.040 inches.

Clause 8. The induced eddy current heating apparatus of Clause 1, wherein the predetermined path (108) is configured such that, over a longitudinal axis of the conductor wire (106), an outer surface area of the conductor wire (106) does not contact another outer surface area of the conductor wire (106).

Clause 9. The induced eddy current heating apparatus of Clause 1, wherein the conductor wire (106) comprises at least one of a plurality of braided copper wires, a plurality of a stranded copper wire and a solid copper wire.

Clause 10. The induced eddy current heating apparatus of Clause 9, wherein individual wires of the conductor wire (106) are coated with a film.

Clause 11. The induced eddy current heating apparatus of Clause 1, wherein the conductor wire (106) comprises a Litz wire.

Clause 12. The induced eddy current heating apparatus of Clause 11, wherein the Litz wire comprises an outer insulation.

Clause 13. The induced eddy current heating apparatus of Clause 1, wherein the conductor wire (106) is configured to receive an alternating current (AC) electrical signal (112) at a predetermined frequency range, at a predetermined voltage range and at a predetermined current range from a current source (114).

Clause 14. The induced eddy current heating apparatus of Clause 13, wherein the conductor wire (106) is configured to operate as an antenna that radiates radio waves in response to the alternating current (AC) electrical signal (112).

Clause 15. The induced eddy current heating apparatus of Clause 13, wherein the conductor wire (106) is configured to generate a magnetic field (302) in response to the alternating current (AC) electrical signal (112).

Clause 16. The induced eddy current heating apparatus of Clause 13, wherein the predetermined frequency range is between about 1 kHz and about 400 kHz.

Clause 17. The induced eddy current heating apparatus of Clause 13, wherein the predetermined frequency range is at least one of between about 1 kHz and about 10 kHz, between about 10 kHz and about 20 kHz, between about 20 kHz and about 50 kHz, between about 50 kHz and about 100 kHz, between about 100 kHz and about 200 kHz and between about 200 kHz and about 350 kHz.

Clause 18. The induced eddy current heating apparatus of Clause 13, wherein the predetermined voltage range is between about 50 volts and about 70 volts.

Clause 19. The induced eddy current heating apparatus of Clause 13, wherein the predetermined voltage range is between about 10 volts and about 300 volts.

Clause 20. The induced eddy current heating apparatus of Clause 13, wherein the predetermined current range is between about 10 amps and about 1000 amps.

Clause 21. The induced eddy current heating apparatus of Clause 1, wherein the conductor wire (106) is a select wire size that ranges between 14 American wire gauge (AWG) wire through 26 AWG wire.

Clause 22. The induced eddy current heating apparatus of Clause 1, wherein the conductor wire (106) is sewn to the first major surface (104) by the susceptor wire (110) using at least one of a satin stitch (202), a "Z" zigzag stitch (204), a zigzag stitch (206), a cross stitch (208), a herringbone stitch (210) and a double stitch.

Clause 23. The induced eddy current heating apparatus of Clause 1, wherein portions of the susceptor wire (110) that cross the conductor wire (106) cross approximately perpendicular to a longitudinal axis of the conductor wire (106).

Clause 24. The induced eddy current heating apparatus of Clause 1, wherein the susceptor wire (110) comprises a nickel-iron ferromagnetic alloy.

Clause 25. The induced eddy current heating apparatus of Clause 1, wherein the susceptor wire (110) comprises a mu-metal.

Clause 26. The induced eddy current heating apparatus of Clause 1, wherein the susceptor wire (110) comprises at least one of carbon (C), chromium (Cr), copper (Cu), iron (Fe), manganese (Mn), molybdenum (Mo), nickel (Ni), phosphorous (P), silicon (Si) and sulfur (S).

Clause 27. The induced eddy current heating apparatus of Clause 1, wherein the susceptor wire (110) comprises an alloy comprising about 68 percent iron (Fe) and about 32 percent nickel (N).

Clause 28. The induced eddy current heating apparatus of Clause 1, wherein the susceptor wire (110) comprises an alloy comprising about 66 percent iron (Fe) and about 34 percent nickel (N).

Clause 29. The induced eddy current heating apparatus of Clause 1, wherein the susceptor wire (110) is configured to inductively receive energy from a magnetic field (302) generated by the conductor wire (106), to generate eddy currents (304) in response to the inductively received energy and to radiate heat (306) in response to the eddy currents (304).

Clause 30. The induced eddy current heating apparatus of Clause 1, wherein the susceptor wire (110) is configured to lose permanent magnetic properties at a predetermined maximum temperature.

Clause 31. The induced eddy current heating apparatus of Clause 30, wherein the predetermined maximum temperature is based at least in part on an alloy composition of the susceptor wire (110).

Clause 32. The induced eddy current heating apparatus of Clause 30, wherein the predetermined maximum temperature is a Curie temperature for the susceptor wire (110).

Clause 33. The induced eddy current heating apparatus of Clause 30, wherein the predetermined maximum temperature is at least one of about 400° F., about 350° F., about 275° F., about 250° F., about 180° F., about 140° F., about 130° F., about 120° F., about 117° F., about 110° F., about 105° F., about 103° F., about 100° F., about 95° F., about 89° F., about 82° F., about 75° F. and about 68° F.

Clause 34. The induced eddy current heating apparatus of Clause 1, wherein the susceptor wire (110) has a diameter that ranges between about 0.005 inches and about 0.015 inches.

Clause 35. The induced eddy current heating apparatus of Clause 1, wherein the susceptor wire (110) has a diameter that ranges between about 0.005 inches and about 0.040 inches.

Clause 36. The induced eddy current heating apparatus of Clause 1, wherein the susceptor wire (110) is a select wire size that ranges between 18 American wire gauge (AWG) wire through 36 AWG wire.

Clause 37. The induced eddy current heating apparatus of Clause 1, wherein the susceptor wire (110) comprises a plurality of wire segments.

Clause 38. The induced eddy current heating apparatus of Clause 1, wherein the susceptor wire (110) comprises an insulation coating.

Clause 39. A method (400) for generating induced eddy current heating, the method comprising: receiving (402) an alternating current (AC) electrical signal (112) having a predetermined frequency range, a predetermined voltage range and a predetermined current range from a current source (114) at a conductor wire (106) overlaid in a predetermined path (108) on a flexible substrate (102) of an induced eddy current heating apparatus (100); generating (404) a magnetic field (302) in a region around the conductor wire (106) in response to the alternating current (AC) electrical signal (112); inductively receiving (406) energy from the magnetic field (302) at a susceptor wire (110) of the induced eddy current heating apparatus (100), wherein the susceptor wire (110) extends back and forth through the flexible substrate (102) and back and forth across the conductor wire (106) to sew the conductor wire (106) to the flexible substrate (102); generating (408) eddy currents (304) in the susceptor wire (110) in response to the inductively received energy; and radiating (410) heat (306) from the susceptor wire (110) in response to the eddy currents (304).

Clause 40. The method of Clause 39, wherein the induced eddy current heating apparatus (100) is configured to generate induced eddy current heating below a predetermined maximum temperature.

Clause 41. The method of Clause 40, wherein the predetermined maximum temperature is: a temperature within a range spanning from about 250° F. to about 400° F.; or a temperature within a range spanning from about 250° F. to about 275° F.; or a temperature within a range spanning from about 65° F. to about 180° F.

Clause 42. The method of Clause 39, wherein the predetermined path (108) is configured such that, over a longitudinal axis of the conductor wire (106), an outer surface area of the conductor wire (106) does not contact another outer surface area of the conductor wire (106).

Clause 43. The method of Clause 39, wherein the conductor wire (106) is configured to operate as an antenna that radiates radio waves in response to the alternating current (AC) electrical signal (112).

Clause 44. The method of Clause 39, wherein the predetermined frequency range is between about 1 kHz and about 400 kHz.

Clause 45. The method of Clause 39, wherein the predetermined voltage range is between about 10 volts and about 300 volts.

Clause 46. The method of Clause 39, wherein the predetermined current range is between about 10 amps and about 1000 amps.

Clause 47. The method of Clause 39, wherein the conductor wire (106) is sewn to the flexible substrate (102) by the susceptor wire (110) using at least one of a satin stitch (202), a "Z" zigzag stitch (204), a zigzag stitch (206), a cross stitch (208), a herringbone stitch (210) and a double stitch.

Clause 48. The method of Clause 39, wherein portions of the susceptor wire (110) that cross the conductor wire (106) cross approximately perpendicular to a longitudinal axis of the conductor wire (106).

Clause 49. The method of Clause 39, wherein the susceptor wire (110) is configured to lose permanent magnetic properties at a predetermined maximum temperature.

Clause 50. The method of Clause 49, wherein the predetermined maximum temperature is based at least in part on an alloy composition of the susceptor wire (110).

Clause 51. The method of Clause 49, wherein the predetermined maximum temperature is a Curie temperature for the susceptor wire (110).

Clause 52. A method (500) of manufacturing an induced eddy current heating apparatus (100), the method comprising: obtaining (502) a flexible substrate (102) having a predetermined dimension, a first major surface (104) and a second major surface; overlaying (504) a conductor wire (106) in a predetermined path (108) on the first major surface (104) of the flexible substrate (102); and sewing (506) the conductor wire (106) to the first major surface (104) of the flexible substrate (102) using a susceptor wire (110).

Clause 53. The method of Clause 52, wherein the predetermined dimension is sized to permit the induced eddy current heating apparatus (100) to fit inside a thermally conductive enclosure (118) associated with at least one of a beverage warmer, a consumer heating pad, a consumer heating blanket, a heater blanket for curing a composite material repair and a heater blanket for curing a composite material.

Clause 54. The method of Clause 52, wherein the predetermined path (108) is configured such that, over a longitudinal axis of the conductor wire (106), an outer surface area of the conductor wire (106) does not contact another outer surface area of the conductor wire (106).

Clause 55. The method of Clause 52, wherein the sewing (506) comprises extending (602) the susceptor wire (110) back and forth through the flexible substrate (102) and back and forth across the conductor wire (106).

Clause 56. The method of Clause 55, wherein portions of the susceptor wire (110) that cross the conductor wire (106) cross approximately perpendicular to a longitudinal axis of the conductor wire (106).

Clause 57. The method of Clause 52, wherein the sewing (506) comprises using (604) at least one of a satin stitch (202), a "Z" zigzag stitch (204), a zigzag stitch (206), a cross stitch (208), a herringbone stitch (210) and a double stitch to sew the conductor wire (106) to the first major surface (104) of the flexible substrate (102).

Clause 58. The method of Clause 52, wherein the sewing (506) is performed using a sewing machine.

Clause 59. The method of Clause 58, wherein the sewing machine is a computer numeric code (CNC) sewing machine.

Clause 60. The method of Clause 52, wherein the sewing (506) is performed using an embroidery machine.

Clause 61. The method of Clause 60, wherein the embroidery machine (900) is a computer numeric code (CNC) embroidery machine (700).

Clause 62. The method of Clause 52, wherein the susceptor wire (110) comprises a plurality of wire segments.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the induced eddy current heating apparatus 100 and associated methods 400, 500 have been shown and described, modifications may occur to those skilled in the art upon reading the specification. The present application includes such modifications and is limited only by the scope of the claims.

What is claimed is:

1. An induced eddy current heating apparatus comprising:

a flexible substrate having a first major surface and a second major surface;

a conductor wire overlaid in a predetermined path on the first major surface of the flexible substrate; and a susceptor wire extending back and forth through the first and second major surfaces of the flexible substrate and back and forth across the conductor wire on the first major surface to sew the conductor wire to the first major surface of the flexible substrate.

2. The induced eddy current heating apparatus of claim 1, wherein the apparatus is configured to generate induced eddy current heating below a predetermined maximum temperature.

3. The induced eddy current heating apparatus of claim 2, wherein the predetermined maximum temperature is:

a temperature within a range spanning from 250° F. to 400° F.; or a temperature within a range spanning from 250° F. to 275° F.; or a temperature within a range spanning from 65° F. to 180° F.

4. The induced eddy current heating apparatus of claim 1, wherein the flexible substrate comprises at least one of a mesh, a fabric, a sheet and a film.

5. The induced eddy current heating apparatus of claim 1, wherein the predetermined path is configured such that, over a longitudinal axis of the conductor wire, an outer surface area of the conductor wire does not contact another outer surface area of the conductor wire.

6. The induced eddy current heating apparatus of claim 1, wherein the conductor wire comprises a Litz wire.

7. The induced eddy current heating apparatus of claim 1, wherein the conductor wire is configured to receive an alternating current electrical signal at a predetermined frequency range, at a predetermined voltage range and at a predetermined current range from a current source.

8. The induced eddy current heating apparatus of claim 7, wherein the conductor wire is configured to generate a magnetic field in response to the alternating current electrical signal.

9. The induced eddy current heating apparatus of claim 7, wherein the predetermined frequency range is between 1 kHz and 400 kHz.

10. The induced eddy current heating apparatus of claim 7, wherein the predetermined voltage range is between 50 volts and 70 volts.

11. The induced eddy current heating apparatus of claim 7, wherein the predetermined voltage range is between 10 volts and 300 volts.

12. The induced eddy current heating apparatus of claim 7, wherein the predetermined current range is between 10 amps and 1000 amps.

13. The induced eddy current heating apparatus of claim 1, wherein the conductor wire is sewn to the first major surface by the susceptor wire using at least one of a satin stitch, a "Z" zigzag stitch, a zigzag stitch, a cross stitch, a herringbone stitch and a double stitch.

14. The induced eddy current heating apparatus of claim 1, wherein portions of the susceptor wire that cross the conductor wire cross approximately perpendicular to a longitudinal axis of the conductor wire.

15. The induced eddy current heating apparatus of claim 1, wherein the susceptor wire comprises a nickel-iron ferromagnetic alloy.

16. The induced eddy current heating apparatus of claim 1, wherein the susceptor wire is configured to inductively receive energy from a magnetic field generated by the conductor wire, to generate eddy currents in response to the inductively received energy and to radiate heat in response to the eddy currents.

17. The induced eddy current heating apparatus of claim 1, wherein the susceptor wire is configured to lose permanent magnetic properties at a predetermined maximum temperature.

18. The induced eddy current heating apparatus of claim 17, wherein the predetermined maximum temperature is a Curie temperature for the susceptor wire.

19. A method for generating induced eddy current heating, the method comprising:

receiving an alternating current electrical signal having a predetermined frequency range, a predetermined voltage range and a predetermined current range from a current source at a conductor wire overlaid in a predetermined path on a flexible substrate of an induced eddy current heating apparatus;

generating a magnetic field in a region around the conductor wire in response to the alternating current electrical signal;

inductively receiving energy from the magnetic field at a susceptor wire of the induced eddy current heating apparatus, wherein the susceptor wire extends back and forth through the first and second major surfaces of the flexible substrate and back and forth across the conductor wire on the first major surface to sew the conductor wire to the flexible substrate;

generating eddy currents in the susceptor wire in response to the inductively received energy; and radiating heat from the susceptor wire in response to the eddy currents.

20. A method of manufacturing an induced eddy current heating apparatus, the method comprising:

obtaining a flexible substrate having a predetermined dimension, a first major surface and a second major surface;

overlaying a conductor wire in a predetermined path on the first major surface of the flexible substrate; and sewing the conductor wire to the first major surface of the flexible substrate using a susceptor wire by extending the susceptor wire back and forth through the first and second major surfaces of the flexible substrate and back and forth across the conductor wire on the first major substrate.

* * * * *